(12) United States Patent
Bouchard

(10) Patent No.: US 6,698,782 B2
(45) Date of Patent: Mar. 2, 2004

(54) MULTI-FUNCTIONAL VEHICLE

(76) Inventor: Michel Bouchard, 1051, Chemin Lac Claude Sud, Rawdon, Québec (CA), J0K 1S0

( * ) Notice: Subject to any disclaimer, the term of this patent is extended or adjusted under 35 U.S.C. 154(b) by 0 days.

(21) Appl. No.: 10/227,405

(22) Filed: Aug. 26, 2002

(65) Prior Publication Data

US 2003/0038451 A1 Feb. 27, 2003

(30) Foreign Application Priority Data

Aug. 25, 2001 (GB) .............................................. 0120789

(51) Int. Cl.[7] ................................ B60F 3/00; B60F 5/00
(52) U.S. Cl. .................................................. 280/415.1
(58) Field of Search .......................... 280/415.1, 418.1; 114/61.1, 344

(56) References Cited

U.S. PATENT DOCUMENTS

| | | | | | |
|---|---|---|---|---|---|
| 3,629,884 A | * | 12/1971 | Brown | ....................... | 114/344 |
| 3,744,070 A | * | 7/1973 | Shaw | ....................... | 114/344 |
| 3,760,764 A | * | 9/1973 | Jones et al. | ............... | 114/61.16 |
| 3,860,982 A | * | 1/1975 | Rumsey | ....................... | 114/344 |
| 5,687,669 A | * | 11/1997 | Engler | ....................... | 440/12.52 |
| 6,029,598 A | * | 2/2000 | Stoll | ........................... | 114/344 |
| 6,062,156 A | * | 5/2000 | Radke et al. | ........... | 114/144 R |
| 6,446,569 B1 | * | 9/2002 | Pitts | ............................ | 114/344 |

* cited by examiner

Primary Examiner—Kevin Hurley

(57) ABSTRACT

A multi-functional vehicle for being used selectively on land or in a body of water, the vehicle includes a vehicle frame mounted on two grouped pairs of frame wheels. A passenger cabin is releasably attached to the vehicle frame. A pair of floatation pontoons is releasably attached to the passenger cabin. The vehicle frame is convertible between a cabin receiving configuration and a load receiving configuration. The vehicle can be used to carry additional passengers or load while being attached to conventional vehicles such as conventional ATV vehicles. The trailer can be specifically designed so as to be able to follow the often rugged off-road terrain on which some vehicles such as ATV vehicles are commonly used. The passenger cabin can be readily converted into a water craft through a set a quick and ergonomical steps. The vehicle may also be used on a gliding surface such as snow and converted into a gliding vehicle.

20 Claims, 8 Drawing Sheets

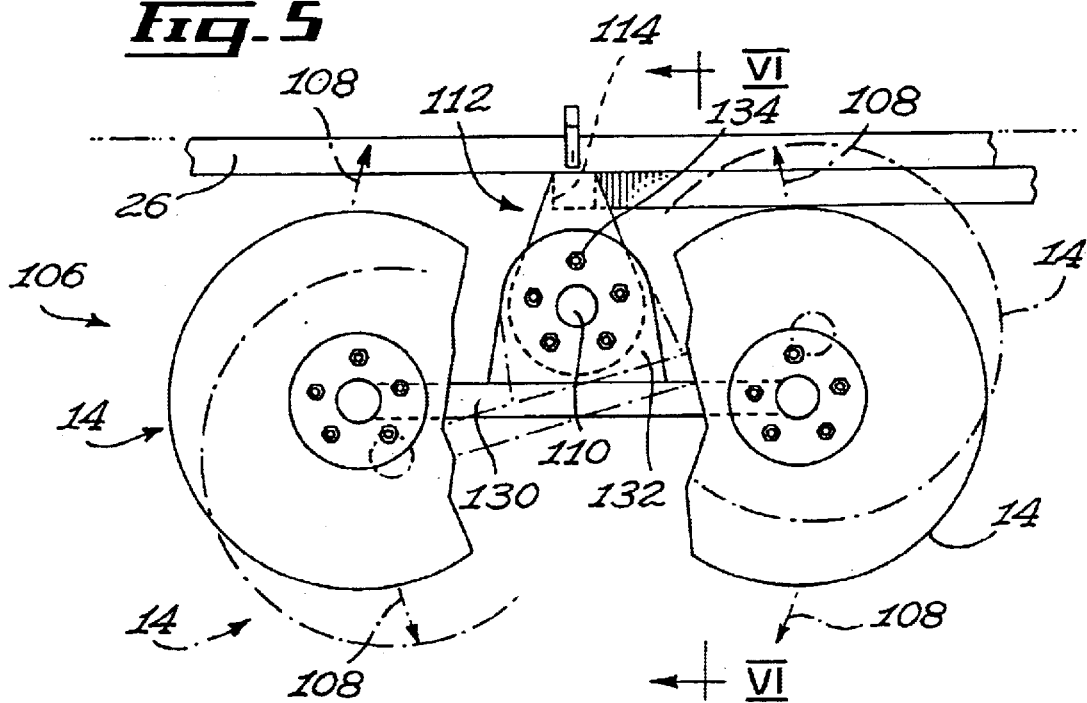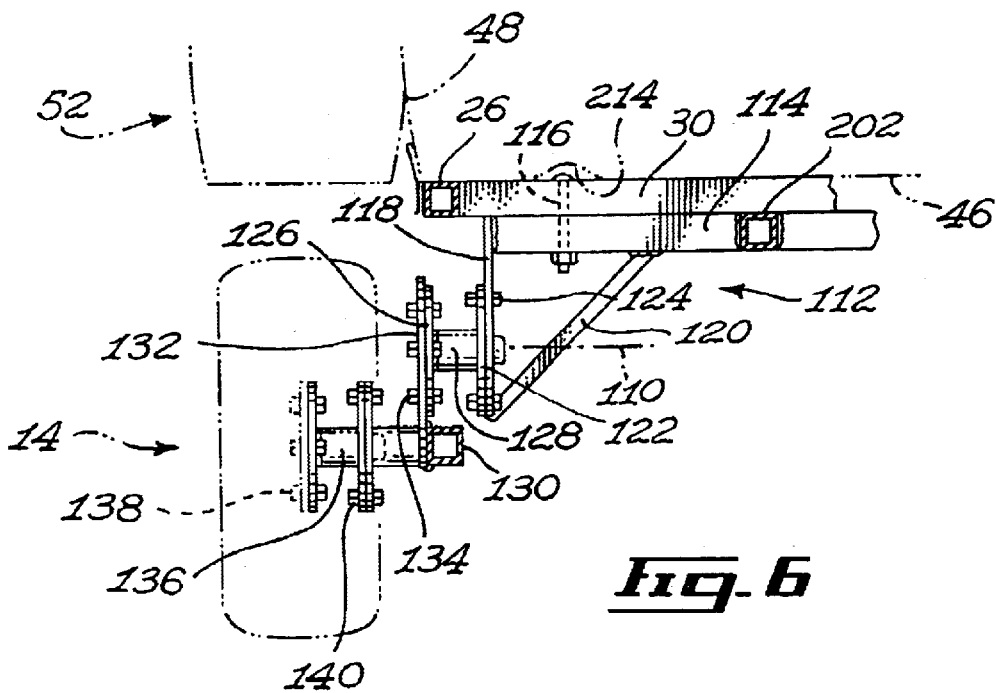

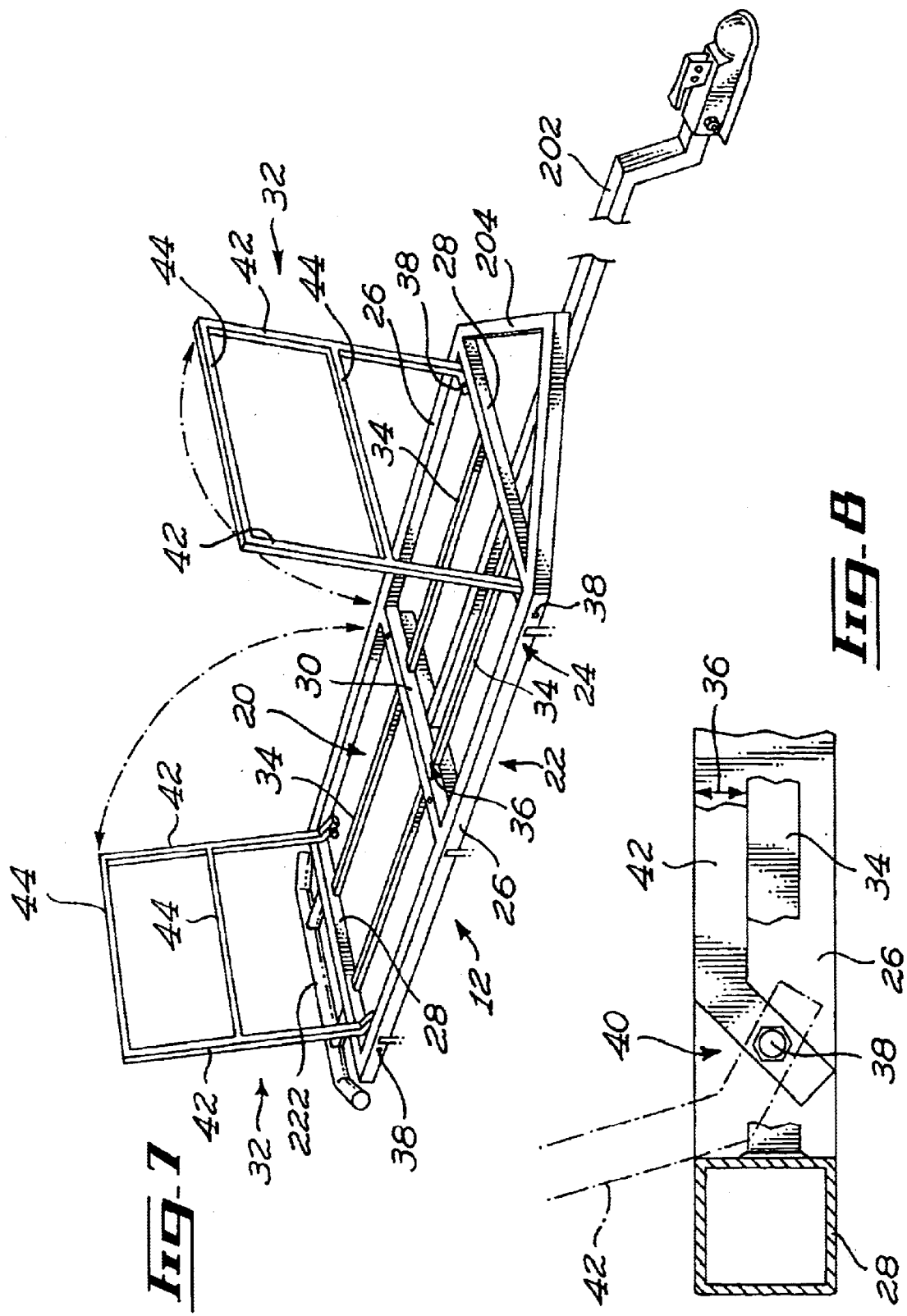

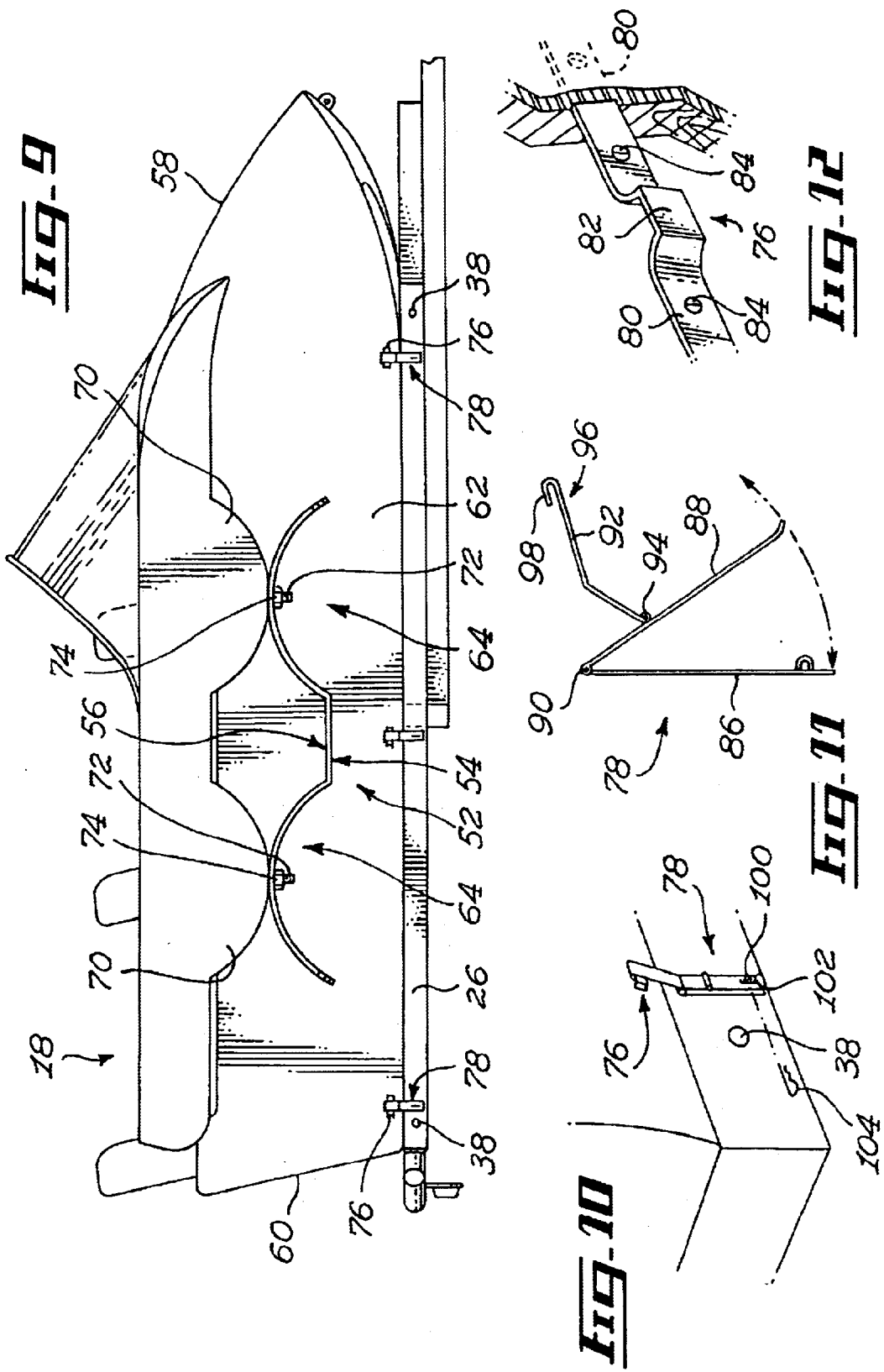

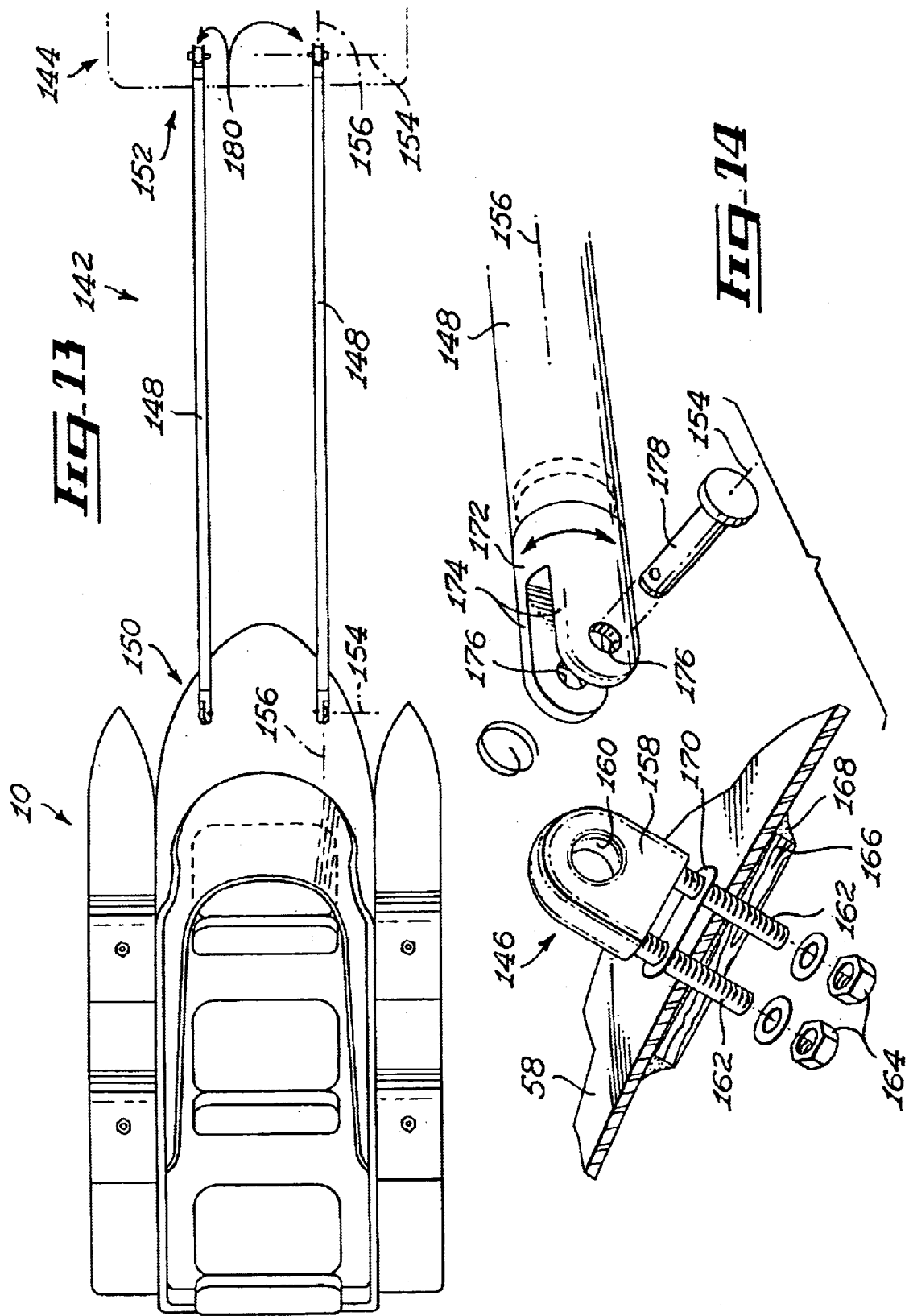

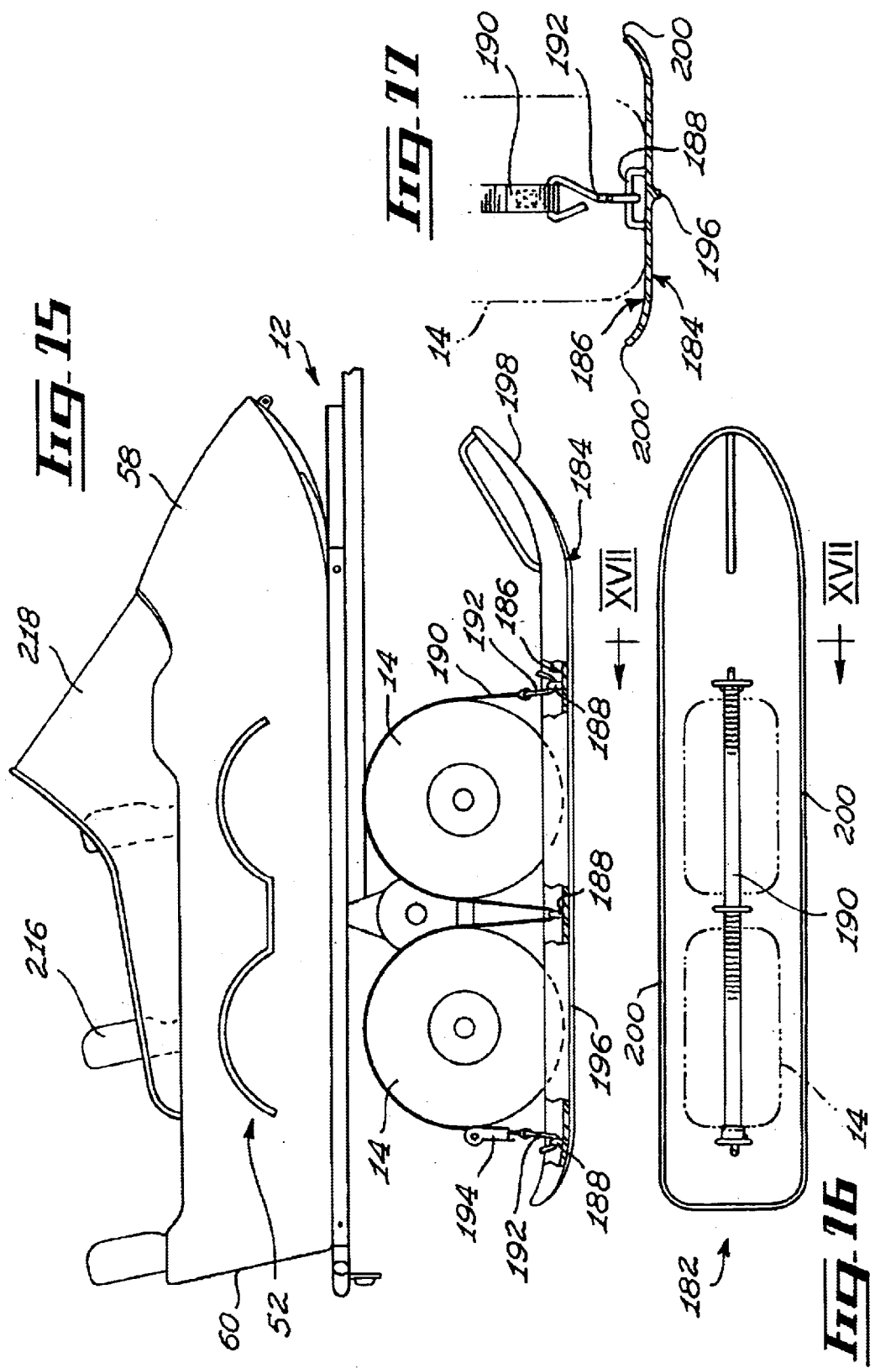

MULTI-FUNCTIONAL VEHICLE

FIELD OF THE INVENTION

The present invention relates to the general field of recreational vehicles and is particularly concerned with a convertible multi-functional vehicle.

BACKGROUND OF THE INVENTION

Recreational all-terrain vehicles also commonly referred to as ATVs have achieved a substantial popularity during the past few years. In order to accommodate off road use, ATVs typically have oversized, soft and heavily threaded tires which are designed for non-pavement surfaces. The tires are typically mounted to a robust steel frame by heavy duty shock absorbers. A powerful gas powered engine is provided for driving the tires. Also, typically, the tires are spaced apart to cast a wide swath and the frame is generally low in order to improve stability of the vehicle.

ATVs are often called upon by outdoorsmen such as hunters, fishermen, campers and the like to carry not only passengers but gears. One of the major drawbacks associated with conventional ATVs relates to the fact that they are typically only intended for use for one or two individuals namely a driver and, in some instances, a passenger. Hence, in situations wherein gear and/or additional passengers need to be carried from one location to the other, conventional ATV owners must resort to making substantial amount of trips in order to carry the equipment and/or passengers. This may prove to be tedious and time consuming especially in off-road conditions.

Although most conventional ATVs are provided with both front and rear carrying racks. This is nevertheless considered inadequate. The volume of gear or equipment attachable to such carrying racks is often insufficient. For example, during a typical weekend camping expedition, an intended user may require numerous pieces of equipment that may not fit on such racks. Furthermore, conventional racks are totally inadequate for transportation of additional passengers.

Problems associated with insufficient carrying accommodations on conventional ATVs have been addressed in the prior art inasmuch as ATVs are commonly equipped with a rearwardly disposed towing tongue assembly which is attachable to a standard trailer hitch. Heretofore, trailers used with ATVs generally have two wheels mounted to a frame with an open rear bed.

Conventional ATV trailers are typically not well adapted for use in all off-road environments traversable by ATVs. Furthermore, such conventional ATV trailers are not adapted to carry passengers. Again, this may prove to be particularly annoying since many instances can rise in which ATVs are called upon to accommodate more than one passenger. As an example, ATVs are frequently used by hunting and camping parties having a guide and several passengers. A separate ATV for each hunter or camper has proven to be a common although impractical and costly solution.

Another problem associated with the prior art ATV trailers is that they are not only often insufficiently adapted for use in off-road environments but are also not well adapted for use on gliding surfaces such as snow or ice. Hence, conventional ATV trailers are not well adapted for use with other vehicles such as snowmobiles or the like.

Still further, during camping and fishing expeditions, it is often useful to carry a boat along. Conventional ATV trailers are not adapted to carrying such a bulky load. Indeed, heretofore trailers for transporting boats and water recreational vehicles are of such size and weight that towing them with vehicles such as ATVs is considered impractical.

Hence, participation in camping and water recreation has been directed in one or two directions. Typically, hunters and fishermen arrive at their destination with their ATVs and are at the mercy of marinas for expensive boats or canoe rentals, if available. The alternative possibility is to have one of the passengers drive a full size car or pick up to tow their large, heavier trailers to participate in their water recreation.

However, this may prove to be impossible in some situations since, by definition, some larger cars or vehicles may not be able to reach the destination reached by ATVs.

It would thus be desirable to provide a solution offering the freedom of using an ATV for transporting a boat or water recreational vehicle on off-road terrain. Also, it may prove to be desirable to provide a trailer that can be used in itself as a water craft that can be either motorized, towed or otherwise propelled on a body of water. Accordingly, there exists a need for a convertible multi-functional vehicle that can be used in a variety of settings including in off-road environments and on water.

SUMMARY OF THE INVENTION

It is a general object of the present invention to provide a convertible multi-functional vehicle selectively useable in both off-road environments and as a water craft on a body of water.

In accordance with the present invention, there is provided a multi-functional vehicle for being used selectively on land or in a body of water, the vehicle comprising: a vehicle frame, the vehicle frame being mounted on a pair of frame wheels rotatably attached thereto; a passenger cabin releasably attachable to the vehicle frame; a cabin releasable attachment means extending between the vehicle frame and the passenger cabin for releasably attaching the passenger cabin to the vehicle frame; a floatation pontoon releasably attachable to the vehicle frame; a pontoon releasable attachment means extending between the passenger cabin and the floatation pontoon for releasably attaching the floatation pontoon to the passenger cabin.

Conveniently, the vehicle frame is convertible between a cabin receiving configuration and a load receiving configuration, wherein when the vehicle frame is in the cabin receiving configuration the vehicle frame allows mounting thereto of the passenger cabin and, when the vehicle frame is in the load receiving configuration, the vehicle frame allows mounting thereto of a load.

Preferably, the pontoon releasable attachment means allows the floatation pontoon to be attached to the passenger cabin in both a pontoon floatation configuration and a pontoon transportation configuration wherein when the floatation pontoon is in the pontoon floatation configuration the floatation pontoon is adapted to allow the passenger cabin to float on the body of liquid and wherein when the floatation pontoon is in the pontoon transportation configuration the floatation pontoon allows the passenger cabin to be mounted on the vehicle frame without interfering with the frame wheels.

Conveniently, a pair of grouped frame wheels attached on each side of the vehicle frame by a suspension mechanism, the suspension mechanism allowing each of the pair of grouped frame wheels to pivot solidarity relative to the vehicle frame about a suspension pivoting axis extending generally transversally across the vehicle frame.

In one embodiment of the invention, the vehicle further includes a ski component, such ski component being attachable to the pair of frame wheels; a ski releasable attachment means extending between the ski component and the frame wheels for releasably attaching the ski component to the frame wheels.

In one embodiment of the invention the vehicle also a tow bar extending frontwardly from the vehicle frame, the tow bar being provided with a tow bar attachment mechanism about a distal tip thereof, the tow bar defining a downwardly extending spacing segment adjacent the tow bar attachment mechanism.

Advantages of the present invention include that the proposed vehicle can be used to carry additional passengers or load while being attached to conventional vehicles such as conventional ATV vehicles. The trailer is specifically designed so as to be able to follow the often rugged off-road terrain on which some vehicles such as ATV vehicles are commonly used.

Also, the proposed vehicle can be used to carry both passengers and gears or other loads on various types of terrains. The cabin of the vehicle can be readily converted into a water craft through a set a quick and ergonomical steps without requiring special tooling or manual dexterity.

The proposed vehicle may hence be used for carrying passengers both on the ground and on a body of water and, optionally, for carrying loads in both environments. The proposed vehicle may also be used on a gliding surface such as snow and converted into a gliding vehicle again through a set of quick and ergonomic steps.

While being used as a water craft, the proposed vehicle may be self propelled or attachable to a towing water craft, again through a set of quick and ergonomic steps. Still furthermore, the proposed vehicle is specifically designed so as to be both aerodynamical and hydrodynamical but being also aesthetical pleasing.

Furthermore, the proposed vehicle is designed so as to be manufacturable using conventional forms of manufacturing so as to provide a convertible multi-purpose vehicle that will be economically feasible, long lasting and relatively trouble-free in operation.

BRIEF DESCRIPTION OF THE DRAWINGS

An embodiment of the present invention will now be disclosed, by way of example, in reference to the following drawings, in which:

FIG. 5: in a partial side elevational view with sections taken out, illustrates part of a suspension system used with a multi-functional vehicle in accordance with an embodiment of the present invention;

FIG. 6: in a partial transversal cross sectional view, illustrates part of the suspension system shown in FIG. 5;

FIG. 7: in a partial perspective view with sections taken out, illustrates a frame, part of a multi-functional vehicle, in accordance with an embodiment of the present invention. The frame being shown in a load transporting configuration;

FIG. 8: in a partial longitudinal cross sectional view with sections taken out, illustrates a part of a releasable locking structure for maintaining the pivotable side walls shown in FIG. 7 in a predetermined relationship relative to the remainder of the frame;

FIG. 9: in a partial side elevational view with sections taken out, illustrates the multi-functional vehicle shown in FIG. 1 in a transportation configuration;

FIG. 10: in a partial perspective view with sections taken out, illustrates a frame-to-cabin releasable locking mechanism for releasably locking the cabin and the frame, both part of the multi-functional vehicle in the transportation configuration shown in FIG. 9;

FIG. 11: in a partial side view, illustrates part of the releasable locking mechanism shown in FIG. 10;

FIG. 12: in a partial cross sectional view with sections taken out, illustrates a locking strip, part of the locking mechanism shown in FIGS. 10 and 11;

FIG. 13: in a top view with sections taken out, illustrates towing bars associated with the multi-functional vehicle in accordance with the present invention. The towing bars being used for towing the multi-functional vehicle when the latter is in its water vehicle configuration;

FIG. 14: in a partial perspective view with sections taken out, illustrates some of the components of the pivotal link between the towing bars and the multi-functional vehicle shown in FIG. 13;

FIG. 15: in a side elevational view with sections taken out, illustrates the multi-functional vehicle in accordance with the present invention in a gliding configuration;

FIG. 16: in a partial top view with sections taken out, illustrates a mounting arrangement, arranged for mounting skis to the multi-functional vehicle;

FIG. 17: in a transversal cross sectional view taken along arrow XVII—XVII of FIG. 16, illustrates part of the mounting arrangement shown in FIGS. 15 and 16.

DETAILED DESCRIPTION

Figure 1:
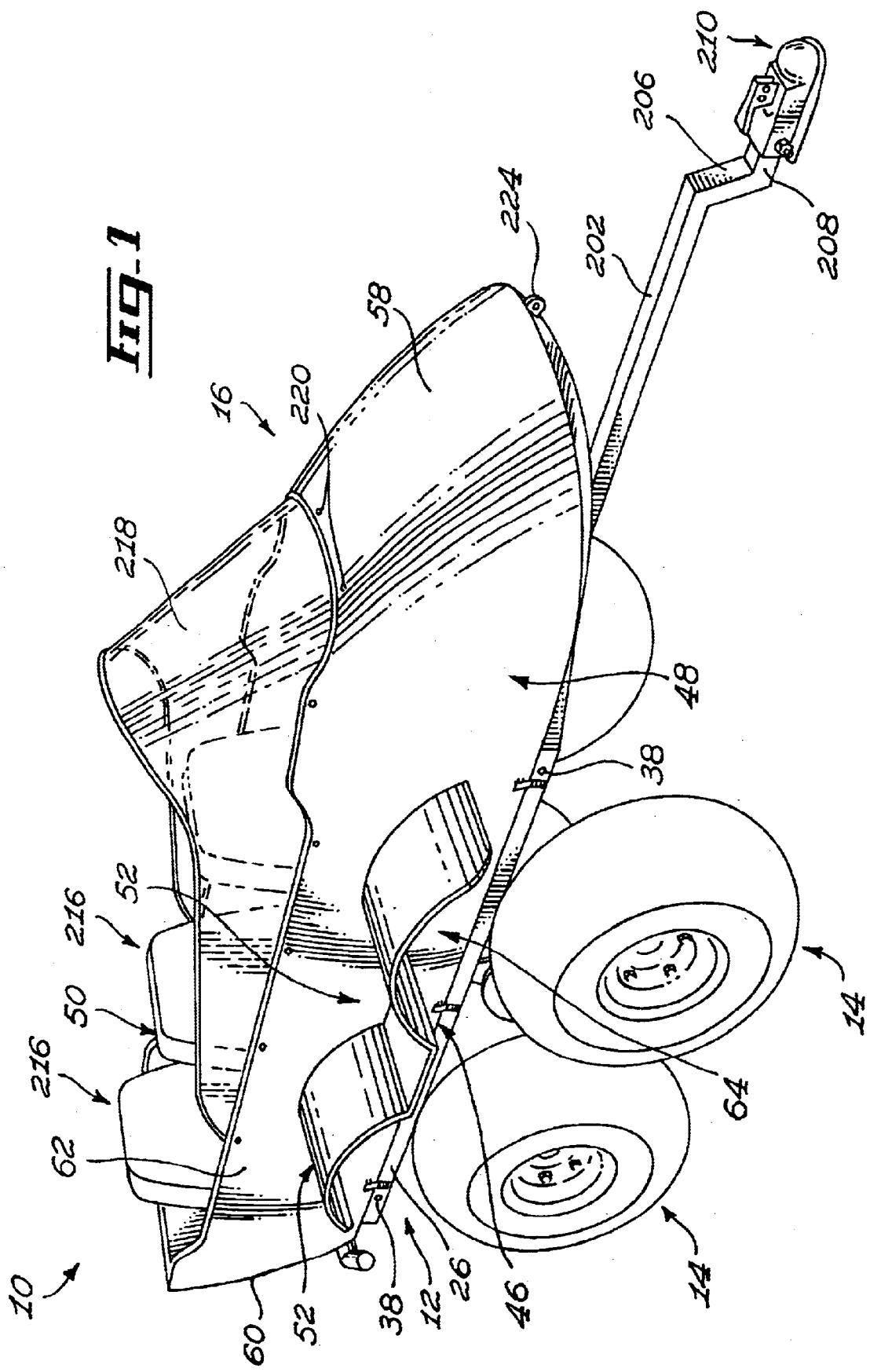
FIG. 1: in a perspective view, illustrates a multi-functional vehicle in accordance with an embodiment of the present invention, the multi-functional vehicle being shown in a rolling configuration.
Figure 2:
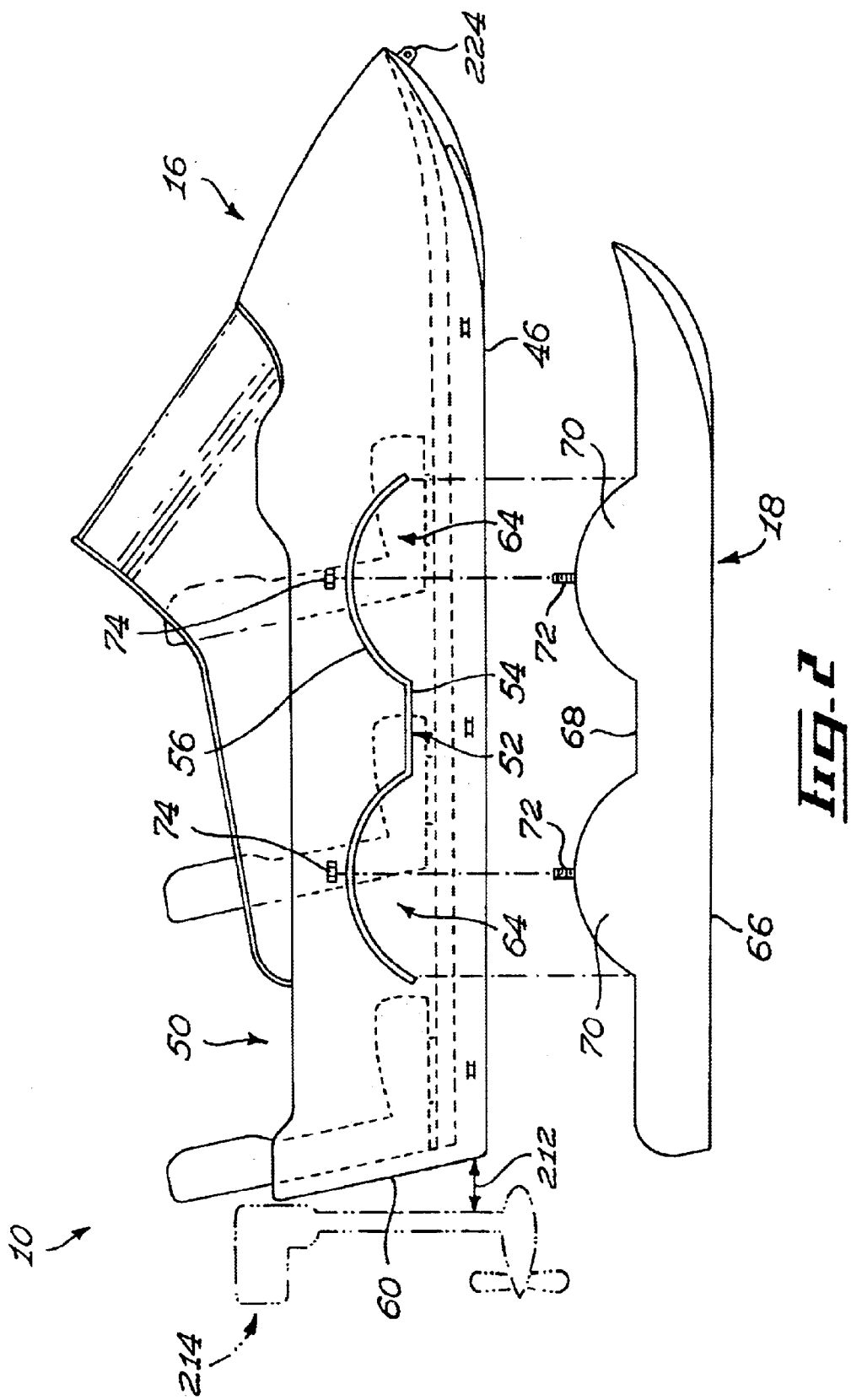
FIG. 2: in a side elevational view with sections taken out, illustrates the multi-functional vehicle shown in FIG. 1 about to be transformed into a water vehicle.
Figure 3:
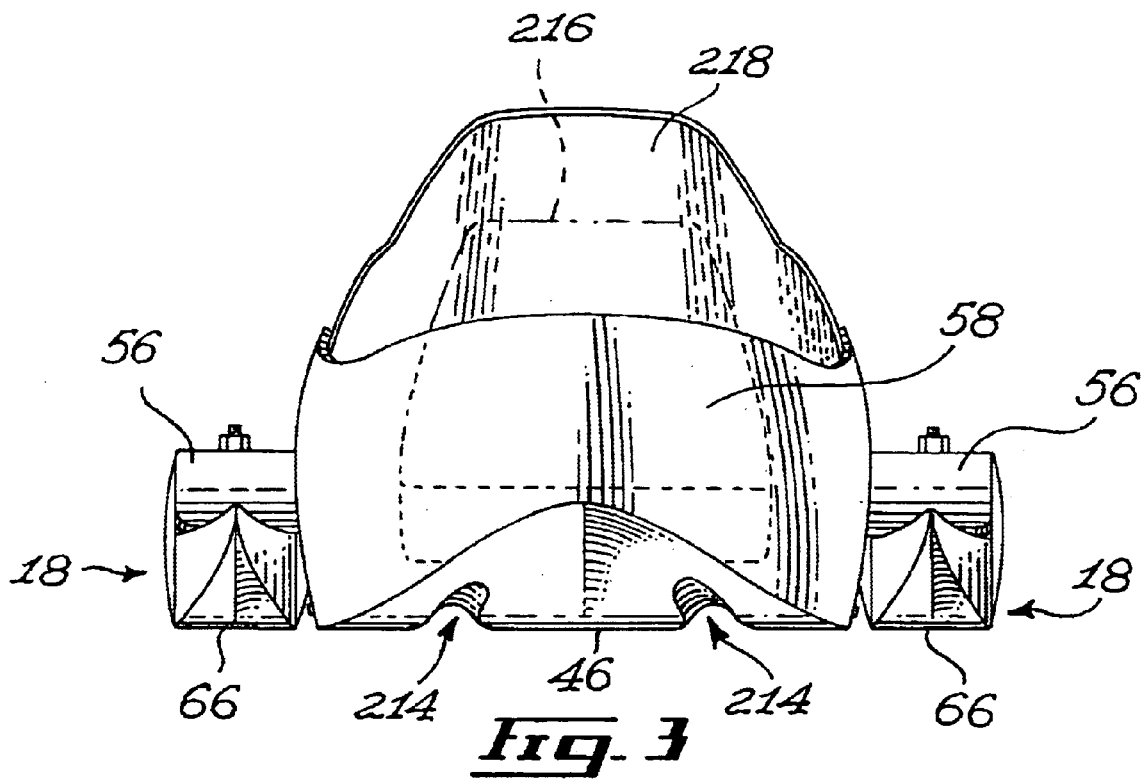
FIG. 3: in a front view, illustrates a multi-functional vehicle in accordance with an embodiment of the present invention in a water vehicle configuration.
Figure 4:
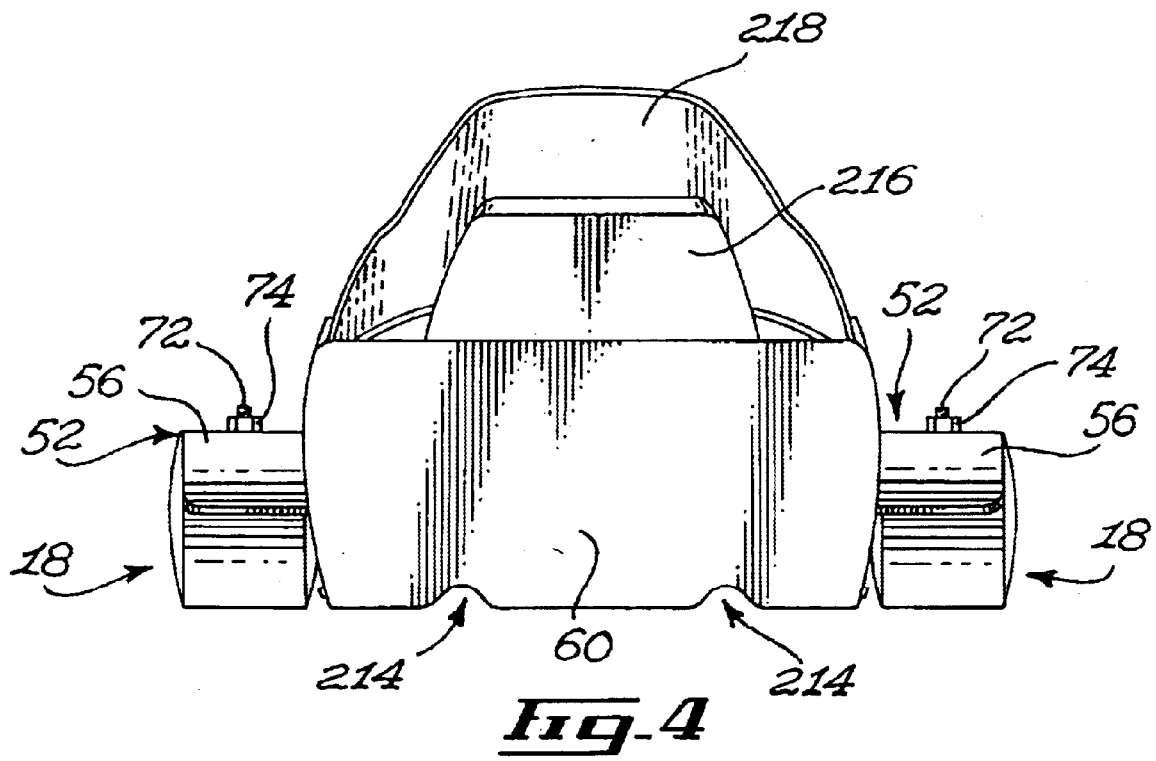
FIG. 4: in a rear view, illustrates the same multi-functional vehicle in accordance with an embodiment of the present invention in a water vehicle configuration.

Referring to FIG. 1, the is shown a multi-functional vehicle (10) in accordance with an embodiment of the present invention. The multi-functional vehicle (10) is shown in a rolling configuration wherein it is adapted to be towed by a motorized vehicle, such as an all-terrain vehicle or any other suitable land vehicle. As shown in FIGS. 2 through 4, the multi-functional vehicle (10) may also be used in a water vehicle configuration wherein it is adapted to float and be propelled on a body of water.

The vehicle (10) includes a vehicle frame (12) mounted on a set of frame wheels (14). The vehicle (10) also includes a passenger cabin (16) releasably attachable to the vehicle frame (12). The vehicle (10) further includes a cabin releasable attachment means extending between the vehicle frame (12) and the passenger cabin (16) for releasably attaching the passenger cabin (16) to the vehicle frame (12).

As illustrated in FIGS. 2 through 4, the vehicle (10) further includes at least one and preferably a pair of floatation pontoons (18) releasably attachable to the vehicle frame (12). The vehicle (10) also includes a pontoon releasable attachment means extending between the passenger cabin (16) and the floatation pontoon (18) for releasably attaching the floatation pontoon (18) to the passenger cabin (16).

Optionally, the vehicle frame (12) is convertible between a cabin receiving configuration shown in FIGS. 1 and 9 and a load receiving configuration shown in FIG. 8. When the vehicle frame (12) is in the cabin receiving configuration, the vehicle frame (12) allows mounting thereto of the passenger cabin (16). Similarly, when the vehicle frame (12) is in the load receiving configuration, the vehicle frame (12) allows mounting thereto of a load such as loose timber, baggage, travel or working accessories or any other suitable load.

As illustrates more specifically in FIG. 7, the vehicle frame (12) defines a frame supporting surface (20), an opposed wheel attachment surface (22) and a frame peripheral edge (24). Typically, although by no means exclusively, the vehicle frame includes a pair of frame longitudinal rods (26) maintained in a predetermined spaced relationship relative to each other by a pair of transversally extending frame end rods (28) and a transversally extending frame intermediate rod (30). The upper surface of the frame longitudinal and intermediate rods (26), (28) and (30) typically forms the frame supporting surface (20). It should however be understood that other frame configurations could be used without departing from the scope of the present invention.

The vehicle frame (12) optionally includes at least one and preferably two peripheral panels (32) attached thereto. Each peripheral panel (32) is moveable between a panel deployed configuration shown in FIG. 7 and a panel retracted configuration shown in FIGS. 1 and 9. When the peripheral panels (32) are in the panel deployed configuration, the peripheral panels (32) extend generally upwardly from the frame supporting surface (20), typically generally adjacent the frame peripheral edge (24).

When the peripheral panels (32) are in the panel retracted configuration, the peripheral panels (32) extend in a generally parallel relationship relative to the frame supporting surface (20). Accordingly, when the peripheral panels (32) are in the panel deployed configuration shown in FIG. 7, the peripheral panels (32) can be used to prevent a load supported on the frame supporting surface (20) from falling off the latter. Similarly, when the peripheral panels (32) are in the panel retracted configuration shown in FIGS. 1 and 9, the peripheral panels (32) allow the passenger cabin (16) to be mounted on the frame supporting surface (20). Hence, when in its rolling configuration, the multi-functional vehicle (10) can be in at least two more specific configurations, namely the passenger and load transporting configurations, respectively illustrated in FIGS. 1 and 7.

Preferably, each peripheral panel (32) is pivotally mounted to the vehicle frame (12) by a panel-to-frame hinge means. Optionally, the peripheral panels (32) could be detachable from the vehicle frame (12) and otherwise moved between the panel deployed and retracted configurations.

In the embodiment shown in FIGS. 7 and 8, the vehicle frame (12) further includes a pair of frame abutment rods (34) extending generally longitudinally between the frame intermediate rod (30) and each frame end rod (28). The upper surface of the frame abutment rods (34) is typically located below the frame supporting surface (20) so as to define a rod spacing (36) therebetween. The rod spacing (36) defines a panel recess for receiving the peripheral panels (32) when the latter are in their panel retracted configuration such as shown in full lines in FIG. 8.

Typically, each peripheral panel (32) is pivotally attached to the frame longitudinal rods (34) adjacent the frame end rods (28) using panel pivotal pins (38). The vehicle (10) typically further includes a panel pivotal stopping means for releasably maintaining the peripheral panels (32) in either one of the panel deployed or retracted configurations. Typically, the panel pivotal stopping means includes having a proximal end (40) of the peripheral panels (32) extending at an angle relative to the remainder of the peripheral panels (32).

The panel proximal end (40) is pivotally attached by the panel pivotal pins (38) to the frame longitudinal rods (26) in such a manner that when the peripheral panels (32) are in the panel deployed configuration at least a portion of the peripheral panels (32) abuts against an adjacent frame end rod (28), such as shown in phantom lines in FIG. 8. Also, when the peripheral panels (32) are in the panel retracted configuration, at least a portion of the peripheral panels (32) abuttingly contacts the upper surface of the frame abutment rods (34) as shown in full lines in FIG. 8.

Typically, each peripheral panel (32) includes a pair of panel spacing segments (42) maintained in a spaced apart relationship relative to each other by a pair of panel retaining segments (44). It should however be understood that the retaining panels (32) could have other configurations such as being formed out of a solid material throughout without departing from the scope of the present invention. Also, peripheral panels (32) could be provided at other locations relative to the vehicle frame (12) without departing from the scope of the present invention.

The pontoon releasable attachment means allows the floatation pontoons (18) to be attached to the passenger cabin (16) in both a pontoon floatation configuration, shown in FIGS. 3 and 4 and a pontoon transportation configuration, shown in FIG. 9. When the floatation pontoons (18) are in the pontoon floatation configuration, they are intended to allow the passenger cabin (16) to float on a body of liquid so that the multi-functional vehicle (10) can be used as a water craft.

When the floatation pontoons (18) are in the pontoon transportation configuration, shown in FIG. 9, the floatation pontoons (18) allow the passenger cabin (16) to be mounted on the vehicle frame (12) without interfering with the frame wheels (14). When the floatation pontoons (18) are in the pontoon transportation configuration, the vehicle (10) can thus be transported on land with the floatation pontoons (18) attached thereto. For example, to bring the multi-functional vehicle (10) on land to a suitable location where the latter can be used as a water craft.

The passenger cabin (16) typically includes a cabin base wall (46), a cabin peripheral wall (48) extending from the cabin base wall (46) and a cabin inner volume (50) at least partially surrounded by the cabin peripheral wall (48). In the embodiment shown throughout the FIGS., the cabin peripheral wall (48) and the cabin base wall (46) form an open top enclosure for receiving the intended passenger within the cabin inner volume (50).

It should however be understood that the cabin peripheral wall could extend only partially around the cabin inner volume (50) or have other configurations without departing from the scope of the present invention. However, preferably, a passenger cabin (16) forms a generally watertight open top enclosure so that the multi-functional vehicle (10) may be safely used as a water craft on bodies of water.

Typically, the passenger cabin (16) further includes at least one and preferably two splash guards (52) extending from an outer surface of the cabin peripheral wall (48). Each splash guard (52) defines a splash guard first surface (54) oriented generally towards the cabin base wall (46) and a generally opposed splash guard second surface (56) oriented generally away from the cabin base wall (46).

Each floatation pontoon (18) is releasably attachable to corresponding splash guard first surface when in said pontoon floatation configuration. Also, said floatation pontoons (18) are releasably attachable to a corresponding splash guard second surface (56) when in said pontoon transportation configuration such as shown in FIG. 9. Also, as illustrated in FIG. 9, the pontoon releasable attachment means allows the floatation pontoons (18) to be attached to a corresponding splash guard (52) in a generally inverted configuration when in their pontoon transportation configuration.

Typically, the cabin peripheral wall (48) defines a wall front segment (58), a wall rear segment (60) and a pair of wall side segments (62) extending therebetween. Also, typically, the vehicle frame (12) is mounted on at least one and preferably two pairs of vehicle wheels (14). Each pair of vehicle wheels (14) typically protrude outwardly relative to a corresponding wall side segment (62). Typically, a splash guard (52) extends outwardly from each wall segment (62) in a generally overlying relationship relative to a corresponding pair of vehicle wheels (14).

Typically, each splash guard (52) defines at least one and preferably two pontoon receiving recesses (64) formed in the splash guard first surface (54). Each floatation pontoon (18) defines a pontoon liquid contacting surface (66) and a generally opposed pontoon attachment surface (68).

Each pontoon attachment surface (68) is preferably provided with at least one and preferably two pontoon abutment protrusions (70) extending therefrom for being substantially matingly inserted into a corresponding pontoon receiving recess (64) when the floatation pontoons (18) are in the pontoon floatation configuration, such as shown in FIGS. 3 and 4.

Typically, each floatation pontoon (18) has a pontoon attachment bolt (72) extending from each of the pontoon abutment protrusions (70) in a direction generally away from the pontoon liquid contacting surface (66). Each splash guard (52) is provided with a pair of corresponding bolt receiving apertures (not shown) for receiving the pontoon attachment bolt (72) both when the floatation pontoons are in the pontoon floatation and transportation configurations, illustrated respectively in FIGS. 3–4 and 9.

An attachment component such as a conventional bolt (74) is typically used for releasably retaining the pontoon attachment bolts (72) within their corresponding bolt receiving apertures. It should be understood that other types of pontoon releasable attachment means could be used without departing from the scope of the present invention.

As illustrated more specifically in FIGS. 9 through 12, the cabin releasable attachment means typically includes a cabin-to-frame hook and loop combination extending between the passenger cabin (16) and the vehicle frame (12) for releasably hooking the passenger cabin (16) to the vehicle frame (12). Typically, the cabin-to-frame hook and loop combination includes at least one and preferably a plurality of loop components (76) extending from the cabin peripheral wall (48) generally adjacent the cabin base wall (46).

The cabin-to-frame hook and loop combination also includes a hook component (78) pivotally attached to the vehicle frame (12) generally adjacent the frame peripheral edge (24). The hook component (78) is pivotable between a hook locking configuration shown in FIGS. 9 and 10 and a hook unlocking configuration shown in FIG. 11. When the hooking component (78) is in the hook locking configuration, the hook locking component (78) lockingly engages the loop component (76) for preventing the separation of the passenger cabin (16) from the frame (12). Conversely, when the hook component (78) is in the hooking unlocking configuration, the hook component (78) is retracted from the loop component (76) to allow separation of the passenger cabin (16) from the vehicle frame (12).

As illustrated more specifically in FIG. 12, the loop component (76) typically includes a retaining strip made out of a generally rigid material. The retaining strip defines a strip anchoring section (80) attached to or at least partially embedded within the cabin peripheral wall (48).

The retaining strip also defines a strip retaining segment (82) protruding from the cabin peripheral wall (48). Typically, each strip retaining segment (82) extends integrally into a pair of strip anchoring sections (80). Also, typically, the strip anchoring sections (80) are attached to the cabin peripheral wall (48) using conventional fastening means (84) such as rivets, screws or the like.

As illustrated more specifically in FIG. 11, each hook component (78) typically includes a hook mounting arm (86) attached to the outer surface of the frame peripheral edge (24).

Each hook component (78) also includes a hook actuating arm (88) pivotally attached about a mounting-to-actuating arm hinge (90) to the hook mounting arm (86).

Each component (78) further includes a hook retaining arm (92) pivotally attached about a retaining-to-actuating arm hinge (94) to the hook actuating arm (88). The hook retaining arm (92) defines a distal tip (96) provided with a hooking segment (98). The hooking segment (98) is configured and sized for hooking engagement with the loop component (76).

As illustrated more specifically in FIG. 10, an arm locking means may optionally be used for releasably locking the hook component (78) in the hook locking configuration. The hook locking means may take any suitable form, such as an eyelet (100) protruding from the hook mounting arm (86) and an eyelet slut (102) formed in the hook actuating arm (88) for receiving the hook eyelet (100). A retaining component such as a clip (104) may be inserted into the protruding section of the eyelet (100) when the latter is inserted into the eyelet slut (102) for releasably locking the hook actuating arm (88) in an abutting relationship with the hook mounting arm (86), such as shown in FIG. 10.

The multi-functional vehicle (10) is preferably provided with a grouped pair of frame wheels (14) attached to the vehicle frame (12) on each side of the latter by a suspension mechanism (106). As indicated by arrows (108) in FIG. 5, the suspension mechanism (106) allows each group pair of frame wheels (14) to pivot solidarity with each other relative to the vehicle frame (12) about a common suspension pivotal axis (110) extending generally transversally across the vehicle frame (12).

As illustrated more specifically in FIGS. 5 and 6, the suspension mechanism (106) typically includes a suspension bracket (112) for mounting the suspension mechanism (106) to the vehicle frame (12). Typically, the suspension bracket (112) includes a bracket transversal rod (114) attached to the frame intermediate rod (30) using suitable fastening means, such as a bolt (116). A bracket main arm (118) and a bracket auxiliary arm (120) extend respectively generally perpendicularly and at an angle from the bracket rod (114). A fixed plate (122) is fixedly attached to the bracket main arm (118) using conventional fastening means, such as bolts (124). A pivoting plate (126) is pivotally attached to the fixed plate (122) using a conventional pivotal linking means such as a ball bearing component (128).

A wheel spacing rod (130) is solidarity attached to the pivoting plate (126) by a linking plate (132). The linking plate (132) is, in turn, solidarity attached to the pivoting plate (126) using bolt components (134). The wheel spacing rod (130) allows for maintaining the frame wheels (14) part of a given grouped pair of frame wheels (14) in a spaced apart relationship relative to each other in a direction generally perpendicular to the suspension pivotal axis (110).

The frame wheels (14) are, in turn, rotatably attached to the wheel spacing rod (130) in a spaced apart relationship relative to each other using a spacing rod (134) extending from a wheel spacing rod (130) and a ball bearing component (136) rotatably attached to the spacing rod (134). The frame wheels (14) are, in turn, releasably attached to the ball bearing component (136) using bolts (138) while the ball bearing component (136) is releasably attached to the spacing rod (134) using bolt components (140).

As illustrated more specifically in FIGS. 13 and 14, the multi-functional vehicle (10) may optionally be further provided with a cabin external attachment means (142) extending from the passenger cabin (16) for releasably attaching the passenger cabin (16) to an external component. The external component may take any suitable form. Typically, when the multi-functional vehicle (10) is in a water craft configuration, the external configuration may take the form of a powered water craft (144) such as a conventional jet ski-type of water craft or any other suitable water craft.

As illustrated more specifically in FIG. 14, the cabin external attachment means typically includes a cabin attachment bracket (146) extending from the passenger cabin (16). More specifically, the cabin attachment bracket (146) typically extends from the wall front segment (58) although it could extend from other portions of the passenger cabin (16) without departing from the scope of the present invention. The cabin external attachment means typically also includes at least one and preferably two attachment rods (148) attachable to the cabin attachment bracket (146). Each cabin attachment rod (148) defines a rod first end (150) and an opposed rod second end (152).

The cabin external attachment means also includes a first releasable universal cabin attachment means extending between the cabin attachment bracket (146) and the cabin attachment rod (148) adjacent the rod first end (150) for releasably attaching the cabin attachment rod (148) to the passenger cabin (16) while allowing relative pivotal movement therebetween about to generally perpendicular attachment rod pivotal axis (154), (156). The cabin external attachment means further includes a second releasable universal cabin attachment means extending from the cabin attachment rod (148) adjacent the rod second end (152) for allowing attachment of the attachment rod (148) to the external component and allowing relative movement therebetween about to generally perpendicular attachment rod pivotal axis (154), (156).

Typically, although by no means exclusively, the cabin attachment bracket (146) includes an attachment plate (158) provided with an attachment aperture (160) extending therethrough. The attachment plate (158) has a pair of both components (152) extending therefrom. The bolt components (162) are adapted to extend into the wall front segment (58) and to be attached thereto using conventional fastening means, such as nuts (164). A reinforcement plate (166) may be attached to the inner surface of the front wall segment (58) using a layer of adhesive material (168) or other suitable means. A water sealing gasket (170) may be interposed between the plate (158) and the outer surface of the front wall segment (58) for ensuring a leak proof connection therebetween.

The first releasable universal attachment means may include a forked attachment bracket (172) pivotally mounted to the attachment rod (148) for pivotal movement about the attachment rod pivotal axis (156). The attachment bracket (172) defines a pair of tines (174) provided with tine apertures (176) extending therethrough. The tine apertures (176) and the attachment aperture (160) are configured and sized for receiving an attachment pin (178).

Typically, the second releasable universal attachment means (180) may have substantially the same configuration. It should be understood that other types of universal releasable attachment means could be used without departing from the scope of the present invention. Typically, the cabin attachment rods (148) are spaced laterally about the wall front segment (58) so as to facilitate maneuvering of the multi-functional vehicle (10) as the latter is being towed by the motorized water craft (144).

As illustrated in FIGS. 15 through 17, the multi-functional vehicle (10) optionally further includes at least one and preferably two ski components (182) for allowing the multi-functional vehicle (10) to glide on a relatively smooth surface, such as snow or ice. The ski component (182) is attachable to the vehicle (10) preferably to the frame wheels (14) of the latter.

A ski releasable attachment means extending between the ski component (182) and the framed wheels (14) is typically provided for releasably attaching the ski component (182) to the frame wheels (14).

The ski component (182) typically defines a ski gliding surface (184) and an opposed ski attachment surface (186). The attachment means typically includes at least two and preferably three ski loops (188) protruding from the ski attachment surface (186). The ski releasable attachment means also includes a ski strap (190) having a pair of strap hooks (192) attached thereto generally adjacent longitudinal ends thereof.

The ski releasable attachment means further includes a tensioning mechanism, such as a binder component (194) for tensioning the ski strap (190) against at least a portion of the frame wheels (14). The ski strap (190) is intended to be frictionally retained against at least a portion of the frame wheels (14) while the latter contact the ski attachment surface (186) and the strap hooks (192) are inserted in the ski loops (188) as shown in FIGS. 15 through 17.

As is well known in the art, the ski gliding surface (184) is typically provided with a stabilizing fin (196) protruding therefrom while also, the ski component (182) is typically provided with an upwardly curved tip (198) and a pair of generally upwardly curved side flanges (200).

As illustrated more specifically in FIGS. 1 and 7, the vehicle frame (12) is typically provided with a tow bar (202) extending generally frontwardly therefrom. Typically the tow bar (202) extends from the bracket bar (114) frontwardly and is also attached to a tow bar reinforcement bracket (204) extending from the frame frontal end bar (28).

The tow bar (202) is typically provided with a generally downwardly extending spacing segment (206) extending integrally into a tow bar attachment segment (208). A conventional tow bar releasable attachment mechanism (210) is attached to the tow bar attachment segment (208) for allowing attachment of the tow bar (202) to an attachment structure such as a motorized vehicle or any other suitable attachment structure, as is well known in the art. The two bar spacing segment (206) is intended to optimize the spatial relationship the vehicle frame (12), a ground surface on which the vehicle is resting and a towing vehicle attached to the tow bar attachment component (210).

As illustrated more specifically in FIG. 2, the wall rear segment (60) is typically beveled inwardly in a direction leading towards the cabin base wall (46) so as to provide a clearance (212) intended to facilitate mounting of a conventional water craft engine (214) at the rear of the passenger cabin (16). The passenger cabin (16) is typically configured so as to provide a generally aerodynamical and also hydrodynamical profile for its intended uses both on ground and in a body of water.

Also, typically, the cabin base wall (46) is provided with at least one and preferably a pair of base wall recesses (214) formed therein for enhancing the hydrodynamical characteristics of the vehicle (10) when the latter is used in its water craft configuration. As shown in FIG. 6, the recesses (214) also intended to provide a clearance for the head of the bolt component (116).

The passenger cabin (16) is preferably further provided with at least one and preferably three seats (216) mounted within the cabin cavity (50). The seats (216) are typically pivotally mounted to the cabin base wall (46). The seats (216) may also be releasably attached to the cabin (46) for allowing modification of the configuration of the interior of the cabin inner volume (50).

The passenger cabin (16) is also further provided with a windshield component (218) having a generally aerodynamical configuration. The windshield component (218) is typically releasably attached to at least a segment of the upper peripheral edge of the passenger cabin (16) using conventional fastening means such as attachment buttons (220). Also, typically, the frame component (12) is optionally provided with a bumper (222) extending from a rear portion thereof. Furthermore, the passenger cabin (16) may be provided with an attachment tongue (224) extending from a forward end thereof.

The embodiments of the invention in which an exclusive privilege or property is claimed are defined as follows:

1. A multi-functional vehicle for being used selectively on land or in a body of water, said vehicle comprising:

a vehicle frame, said vehicle frame being mounted on a pair of frame wheels rotatably attached thereto;

a passenger cabin releasably attachable to said vehicle frame;

a cabin releasable attachment means extending between said vehicle frame and said passenger cabin for releasably attaching said passenger cabin to said vehicle frame;

a floatation pontoon releasably attachable to said vehicle frame;

a pontoon releasable attachment means extending between said passenger cabin and said floatation pontoon for releasably attaching said floatation pontoon to said passenger cabin; said vehicle frame being convertible between a cabin receiving configuration and a load receiving configuration, wherein when said vehicle frame is in said cabin receiving configuration said vehicle frame allows mounting thereto of said passenger cabin and, when said vehicle frame is in said load receiving configuration, said vehicle frame allows mounting thereto of a load; said vehicle frame defining a frame supporting surface and a frame peripheral edge, said vehicle frame including a peripheral panel attached thereto, said peripheral panel being moveable between a panel deployed configuration and a panel retracted configuration, wherein when said peripheral is in panel deployed configuration, said peripheral panel extends generally upwardly from said frame supporting surface generally adjacent said frame peripheral edge and wherein when said peripheral panel is in said panel retracted configuration, said panel extends in a generally parallel relationship relative to said frame supporting surface; whereby when said peripheral panel is in said panel deployed configuration, said peripheral panel is adapted to prevent said load from falling off said train supporting surface and when said peripheral panel is in said panel retracted configuration, said peripheral panel is adapted to allow said passenger cabin to be mounted on said frame supporting surface.

2. A multi-functional vehicle as recited in claim 1 wherein said peripheral panel is pivotally mounted to said vehicle frame by a panel-to-frame hinge means, said vehicle further comprising a panel pivotal stopping means for maintaining said peripheral panel in either one of said panel deployed or retracted configurations.

3. A multi-functional vehicle for being used selectively on land or in a body of water, said vehicle comprising:

a vehicle frame, said vehicle frame being mounted on a pair of frame wheels rotatably attached thereto;

a passenger cabin releasably attachable to said vehicle frame;

a cabin releasable attachment means extending between said vehicle frame and said passenger cabin for releasably attaching said passenger cabin to said vehicle frame;

a floatation pontoon releasably attachable to said vehicle frame;

a pontoon releasable attachment means extending between said passenger cabin and said floatation pontoon for releasably attaching said floatation pontoon to said passenger cabin; said pontoon releasable attachment means allowing said floatation pontoon to be attached to said passenger cabin in both a pontoon floatation configuration and a pontoon transportation configuration wherein when said floatation pontoon is in said pontoon floatation configuration said floatation pontoon is adapted to allow said passenger cabin to float on said body of liquid and wherein when said floatation pontoon is in said pontoon transportation configuration said floatation pontoon allows said passenger cabin to be mounted on said vehicle frame without interfering with said frame wheels; said passenger cabin including a cabin base wall, a cabin peripheral wall extending from said cabin base wall and a cabin inner volume at least partially surrounded by said cabin peripheral wall; said passenger cabin further comprising at least one splash guard extending from an outer surface of said cabin peripheral wall, said splash guard defining a splash guard first surface oriented generally toward the cabin base wall and a generally opposed splash guard second surface oriented generally away from said cabin base wall; said floatation pontoon being releasably attachable to said splash guard first surface when in said pontoon floatation configuration and said floatation pontoon being releasably attachable to said splash guard second surface when said floatation pontoon is in said pontoon transportation configuration.

4. A multi-functional vehicle as recited in claim 3 wherein said pontoon releasable attachment means allows said floatation pontoon to be attached to said splash guard first surface in an inverted configuration when said floatation pontoon is in said transportation configuration.

5. A multi-functional vehicle as recited in claim 4 wherein said cabin peripheral wall defines a pair of wall side segments, said vehicle frame being mounted on a pair of vehicle wheels, each of said vehicle wheels protruding outwardly relative to a corresponding wall side segment, said vehicle including a splash guard extending outwardly from each of said wall side segments in a generally overlying relationship relative to a corresponding vehicle wheel, each of said splash guard defining a generally concave pontoon receiving recess formed in said splash guard first surface, each of said floatation pontoons defining a pontoon liquid contacting surface and a generally opposed pontoon attachment surface, each of said pontoon attachment surfaces being provided with pontoon abutment protuberance extending therefrom for being substantially matingly inserted into a corresponding pontoon receiving recess when said floatation pontoon is in said pontoon floatation configuration.

6. A multi-functional vehicle as recited in claim 5 wherein each of said floatation pontoons has a pontoon attachment bolt extending from said pontoon abutment protrusion in a direction generally away from said pontoon liquid contacting surface, each of said splash guards being provided with a corresponding bolt receiving aperture for receiving said pontoon attachment bolt when said floatation pontoon is in both said pontoon floatation and transportation configurations.

7. A multi-functional vehicle for being used selectively on land or in a body of water, said vehicle comprising:

a vehicle frame, said vehicle frame being mounted on a pair of frame wheels rotatably attached thereto;

a passenger cabin releasably attachable to said vehicle frame;

a cabin releasable attachment means extending between said vehicle frame and said passenger cabin for releasably attaching said passenger cabin to said vehicle frame;

a floatation pontoon releasably attachable to said vehicle frame;

a pontoon releasable attachment means extending between said passenger cabin and said floatation pontoon for releasably attaching said floatation pontoon to said passenger cabin; said cabin releasable attachment means including a cabin-to-frame hook and loop combination extending between said passenger cabin and said vehicle frame for releasably hooking said passenger cabin to said vehicle frame.

8. A multi-functional vehicle as recited in claim 7 wherein said cabin-to-frame hook and loop combination includes at least one loop component extending from said cabin peripheral wall generally adjacent said cabin base wall and a hook component pivotally attached to said vehicle frame generally adjacent said frame peripheral edge; said hook component being pivotable between a hook locking configuration and a hook unlocking configuration wherein when said hook is in said hook locking configuration said hook component lockingly engages said loop component for preventing the separation of said passenger cabin from said frame and wherein when said hook component is in said hook unlocking configuration said hook component is retracted from said loop component to allow separation of said passenger cabin from said frame.

9. A multi-functional vehicle as recited in claim 8 wherein said loop component includes a retaining strip made of a generally rigid material, said retaining strip defining a strip anchoring section attached to said cabin peripheral wall and a strip retaining segment protruding from said cabin peripheral wall.

10. A multi-functional vehicle as recited in claim 8 wherein said hook component includes a hook mounting arm attached to an outer surface of said frame peripheral edge, a hook actuating arm pivotally attached to said hook mounting arm and a hook retaining arm pivotally attached to said hook actuating arm; said hook retaining arm defining a distal tip provided with a hooking segment for hooking engagement with said loop component.

11. A multi-functional vehicle for being used selectively on land or in a body of water, said vehicle comprising:

a vehicle frame, said vehicle frame being mounted on a pair of frame wheels rotatably attached thereto;

a passenger cabin releasably attachable to said vehicle frame;

a cabin releasable attachment means extending between said vehicle frame and said passenger cabin for releasably attaching said passenger cabin to said vehicle frame;

a floatation pontoon releasably attachable to said vehicle frame;

a pontoon releasable attachment means extending between said passenger cabin and said floatation pontoon for releasably attaching said floatation pontoon to said passenger cabin; said vehicle including a pair of grouped frame wheels attached on each side of said vehicle frame by a suspension mechanism, said suspension mechanism allowing each of said pair of grouped frame wheels to pivot solidarily relative to said vehicle frame about a suspension pivoting axis extending generally transversally across said vehicle frame; said suspension mechanism including a suspension bracket for mounting said suspension mechanism to said vehicle frame; a pivoting plate pivotally attached to said suspension bracket for pivotal movement relative to the latter about said suspension pivoting axis; a wheel spacing rod attached to said pivoting plate for mounting a grouped pair of frame wheels in spaced apart relationship relative to each other in a direction generally perpendicular to said suspension pivoting axis; said frame wheels being rotatably mounted to said wheel spacing rod.

12. A multi-functional vehicle for being used selectively on land or in a body of water, said vehicle comprising:

a vehicle frame, said vehicle frame being mounted on a pair of frame wheels rotatably attached thereto;

a passenger cabin releasably attachable to said vehicle frame;

a cabin releasable attachment means extending between said vehicle frame and said passenger cabin for releasably attaching said passenger cabin to said vehicle frame;

a floatation pontoon releasably attachable to said vehicle frame;

a pontoon releasable attachment means extending between said passenger cabin and said floatation pontoon for releasably attaching said floatation pontoon to said passenger cabin; said multi-functional vehicle further including a cabin external attachment means extending from said passenger cabin for attaching said passenger cabin to an external component; said cabin external attachment means including a cabin attachment bracket extending from said passenger cabin;

a cabin attachment rod attachable to said cabin attachment bracket, said cabin attachment rod defining a rod first end and a rod second end;

a first releasable universal cabin attachment means extending between said cabin attachment bracket and said cabin attachment rod adjacent said rod first end for releasably attaching said cabin attachment rod to said cabin attachment bracket and allowing relative pivotal movement therebetween about two generally perpendicular attachment rod pivotal axis;

a second releasable universal attachment means extending from said cabin attachment rod adjacent said rod second end for releasably attaching said cabin attachment rod to an external component and allowing relative pivotal movement therebetween about two generally perpendicular attachment rod pivotal axis.

13. A multi-functional vehicle for being used selectively on land or in a body of water, said vehicle comprising:

a vehicle frame, said vehicle frame being mounted on a pair of frame wheels rotatably attached thereto;

a passenger cabin releasably attachable to said vehicle frame;

a cabin releasable attachment means extending between said vehicle frame and said passenger cabin for releasably attaching said passenger cabin to said vehicle frame;

a floatation pontoon releasably attachable to said vehicle frame;

a pontoon releasable attachment means extending between said passenger cabin and said floatation pontoon for releasably attaching said floatation pontoon to said passenger cabin; said multi functional vehicle further comprising a ski component, such ski component being attachable to said pair of frame wheels;

a ski releasable attachment means extending between said ski component and said frame wheels for releasably attaching said ski component to said frame wheels.

14. A multi-functional vehicle as recited in claim 13 wherein said ski component defines a ski gliding surface and generally opposed ski attachment surface, said ski releasable attachment means including a pair of ski loop protruding from said ski attachment surface; said ski releasable attachment means also including a ski strap having a pair of strap hooks attached thereto; said ski releasable attachment means further including a tensioning mechanism for tensioning said ski strap against said frame wheels when said ski attachment surface abuttingly contacts said frame wheels and said strap hooks are hooked in said ski loops.

15. A multi-functional vehicle for being used selectively on land or in a body of water, said vehicle comprising:

a vehicle frame, said vehicle frame being mounted on a pair of frame wheels rotatably attached thereto;

a passenger cabin releasably attachable to said vehicle frame;

a cabin releasable attachment means extending between said vehicle frame and said passenger cabin for releasably attaching said passenger cabin to said vehicle frame;

a floatation pontoon releasably attachable to said vehicle frame;

a pontoon releasable attachment means extending between said passenger cabin and said floatation pontoon for releasably attaching said floatation pontoon to said passenger cabin; said multi-functional vehicle further comprising a tow bar extending frontwardly from said vehicle frame, said tow bar being provided with a tow bar attachment mechanism about a distal tip thereof, said tow bar defining a downwardly extending spacing segment adjacent said tow bar attachment mechanism.

16. A multi-functional vehicle for being used selectively on land or in a body of water, said vehicle comprising:

a vehicle frame, said vehicle frame being mounted on a pair of frame wheels rotatably attached thereto;

a passenger cabin releasably attachable to said vehicle frame;

a cabin releasable attachment means extending between said vehicle frame and said passenger cabin for releasably attaching said passenger cabin to said vehicle frame;

a floatation pontoon releasably attachable to said vehicle frame;

a pontoon releasable attachment means extending between said passenger cabin and said floatation pontoon for releasably attaching said floatation pontoon to said passenger cabin; said passenger cabin defining a cabin base wall, said cabin base wall being provided with an hydrodynamical and aerodynamical recess formed therein and extending generally longitudinally therealong.

17. A multi-functional vehicle for being used selectively on land or in a body of water, said vehicle comprising:

a vehicle frame, said vehicle frame being mounted on a pair of frame wheels rotatably attached thereto;

a passenger cabin releasably attachable to said vehicle frame;

a cabin releasable attachment means extending between said vehicle frame and said passenger cabin for releasably attaching said passenger cabin to said vehicle frame;

a floatation pontoon releasably attachable to said vehicle frame;

a pontoon releasable attachment means extending between said passenger cabin and said floatation pontoon for releasably attaching said floatation pontoon to said passenger cabin; said passenger cabin being provided with at least one seat mounted therein, said at least one seat being both releasably and pivotally mounted within said passenger cabin.

18. A multi-functional vehicle for allowing selective use thereof on land or in a body of water, said multi-functional vehicle comprising:

a vehicle frame; said vehicle frame being mounted on a pair of frame wheels rotatably attached thereto;

a passenger cabin releasably attachable to said vehicle frame;

a cabin releasable attachment means extending between said vehicle frame and said passenger cabin for releasably attaching said passenger cabin to said vehicle frame;

a floatation pontoon releasably attachable to said vehicle frame;

a pontoon releasable attachment means extending between said passenger cabin and said floatation pontoon for releasably attaching said floatation pontoon to said passenger cabin;

a ski component, said ski component being attachable to said pair of frame wheels;

a ski releasable attachment means extending between said ski component and said frame wheels for releasably attaching said ski component to said frame wheels;

a suspension mechanism attached to both said vehicle frame and said frame wheels for allowing said pair of frame wheels to pivot solidarily about a suspension pivoting axis extending generally transversally across said vehicle frame.

19. A multi-functional vehicle as recited in claim 18 wherein said vehicle frame is convertible between a cabin receiving configuration and a load receiving configuration wherein said vehicle frame is in said cabin receiving configuration said vehicle frame allows mounting thereto of said passenger cabin and wherein when said vehicle frame is in said load receiving configuration said vehicle frame allows mounting thereto of a load.

20. A multi-functional vehicle as recited in claim 19 wherein said pontoon releasable attachment means allows said floatation pontoon to be attached to said passenger cabin in both a pontoon floatation configuration and a pontoon transportation configuration wherein when said floatation pontoon is in said pontoon floatation configuration said pontoon is adapted to allow said passenger cabin float on a body of liquid and wherein when said floatation pontoon is in said pontoon transportation configuration said floatation pontoon allows said passenger cabin to be mounted onto said vehicle frame without interfering with said frame wheels.

* * * * *